United States Patent Office 3,465,048
Patented Sept. 2, 1969

3,465,048
METHOD FOR PREPARING 2,6-XYLENOL
Ken Ito and Hiroshi Kaminaka, Toyonaka-shi, Norio Kotera, Amagasaki-shi, Kosuke Shigehiro and Hiroshi Kuruma, Takarazuka-shi, and Kenji Tanimoto, Minoo-shi, Japan, assignors to Sumitomo Chemical Company, Ltd., Osaka, Japan, a corporation of Japan
No Drawing. Filed Jan. 23, 1967, Ser. No. 610,817
Claims priority, application Japan, Mar. 8, 1966, 41/14,525
Int. Cl. C07c 39/06, 37/14
U.S. Cl. 260—621                              7 Claims

ABSTRACT OF THE DISCLOSURE

A method for preparing 2,6-xylenol being useful as an intermediate of polyphenylene oxide resin in which phenol is subjected to tertiary-butylation at 4-position; hydroxymethylation at 2- and 6-position; reduction of hydroxymethyls to methyls; and detertiary-butylation to form 2,6-xylenol. Similarly 2,6-xylenol is produced from o-cresol, and o-cresol is produced from phenol.

---

The present invention relates to a method for preparing methyl substituted phenolic compound such as 2,6-xylenol or ortho-cresol, 2,6-xylenol is useful as an intermediate of polyphenylene oxide resin or agricultural chemicals and ortho-cresol is useful as an intermediate of agricultural chemicals, especially herbicide, or dyestuff.

2,6-xylenol is contained in petroleum or coal tar, however the amount thereof is small, and it forms an azeotropic mixture with other cresols. Azeotropes of coal tar phenols were disclosed, for example, in the Chemical Abstracts, vol. 47, page 934. In view of these points it was difficult to obtain 2,6-xylenol of high purity in a large amount.

On the other hand, various kinds of synthetic methods for producing 2,6-xylenol were proposed.

One of them was direct methylation method of phenol nucleus. For example, the Chemical Engineering News, Feb. 28, 1966, page 57, and the United Kingdom Patent Number 717,588 disclosed the method in which 2,6-xylenol may be obtained by reacting phenol or ortho-cresol with methanol in gaseous phase. However pure 2,6-xylenol could not be obtained by this method.

Further the Journal of the American Chemical Society, vol. 72, pages 2762 to 2763 (1950) disclosed the method in which 2,6-xylenol was obtained by reacting ortho-cresol with formaldehyde and dimethylamine and then reducing the resultant 2-methyl-6 - (N,N-dimethylamino)methylphenol in the presence of a catalyst. However the yield of this process was poor and dimethylamine was consumed and a process for recovering dimethylamine was necessary in this method.

Furthermore the Journal of Applied Chemistry, vol. 2, pages 88 to 90 disclosed the method in which 2,6-xylenol was obtained by converting 4-chlorophenol to 2,6-dihydroxymethyl-4-chlorophenol and then reducing the resultant 2,6-dihydroxymethyl-4-chlorophenol in the presence of Raney-nickel catalyst. However this method was not advantageous, because pure 4-chlorophenol and pure 2,6-dihydroxymethyl-4-chlorophenol were not obtained easily, and the catalyst employed tended to be poisoned and further it was difficult to recycle chlorine through the process.

Furthermore French Patent Number 1,377,943 disclosed the method in which 2,6-xylenol was obtained by reacting cyclohexanone with formaldehyde to yield 2,6-dihydroxymethylcyclohexanone and dehydrogenating and dehydrating the resultant 2,6-dihydroxymethylcyclohexanone in the presence of a catalyst. However the yield of this process was poor.

As mentioned above, it was difficult to obtain 2,6-xylenol in a pure state at low cost and in many cases the by-production of isomers of 2,6-xylenol was unavoidable.

Therefore it is not too much to say that a satisfactory synthetic method is not found yet.

The source of supply of ortho-cresol depends upon the natural substance such as petroleum or coal tar, and tends to fluctuate in the amount and the price thereof. Although many methods for producing ortho-cresol are proposed, however there is no satisfactory synthetic method for producing ortho-cresol, because in the known methods difficultly removable by-products, for example, isomers of ortho-cresol, are produced.

In order to overcome the difficulties that 2,6-xylenol or ortho-cresol was not obtained easily in a pure state, the present inventors studied to find the method in which pure 2,6-xylenol or ortho-cresol not containing any unremovable by-product such as isomers of 2,6-xylenol or ortho-cresol can be prepared by using a raw material being easy to obtain, and reached the method of the present invention. According to the present invention phenol or ortho-cresol may be employed as the raw material and pure 2,6-xylenol or ortho-cresol may be prepared easily.

In order to avoid by-production of isomers of 2,6-xylenol or ortho-cresol in the production of 2,6-xylenol or ortho-cresol from phenol or ortho-cresol, a method in which phenol or ortho-cresol is substituted with a suitable substituent at the para-position thereof and then substituted with methyl(s) at the ortho-position(s) thereof, and finally the substituent at the para-position is removed to yield 2,6-xylenol or ortho-cresol may be considered. The present inventors have found that a tertiary-alkyl is a suitable substituent for this purpose.

A tertiary-alkyl such as tertiary-butyl is introduced easily into phenol nucleus in the presence of an acidic catalyst at a low temperature and removed easily from phenol nucleus at a high temperature and the substitution proceeds at the special position of phenol nucleus with high selectivity under a suitable reaction condition.

If a tertiary-alkyl is substituted at the para-position of phenol nucleus, the next reaction may not proceed at the ortho-position of the tertiary-alkyl, that is, the meta-position of hydroxyl, because the reaction is affected by the steric hindrance of the bulky tertiary-alkyl. As a result the next substitution after the tertiary-alkylation of phenol may proceed at the ortho-position of hydroxyl of phenol nucleus.

As above mentioned, the condition is set for an introduction of methyl into the ortho-position of hydroxyl of phenolic compound by converting phenol compound to 4-tertiary-alkylphenol compound, and one or two methyl(s) may be introduced into the ortho-position(s) of the hydroxyl of the phenol nucleus.

Finally the tertiary-alkyl is removed, so ortho-methylated phenolic compound may be obtained.

It is one object of the present invention to provide a novel process for preparing pure methyl substituted phenolic compound such as 2,6-xylenol or ortho-cresol in good yield at low cost. Other objects will be apparent from the following description.

The present method is shown in the following chemical equation:

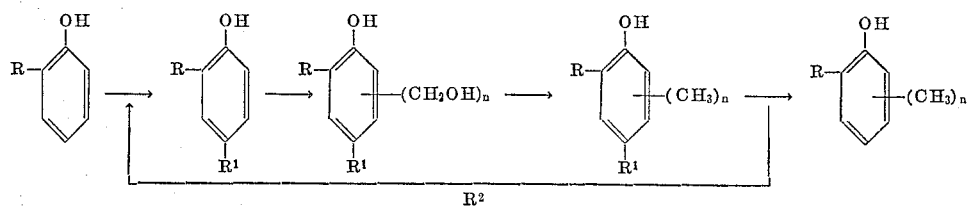

wherein R represents hydrogen or methyl; $R^1$ represents a tertiary-alkyl having 4 to 6 carbon atoms; $R^2$ represents a tertiary-alkylation agent derived from said tertiary-alkyl represented by $R^1$; and $n$ is 1 or 2 and if R is methyl $n$ is 1, and hydroxymethyl or methyl is linked to the phenol nucleus at 2- or 6-position of hydroxyl. In the present method tertiary-butyl is preferable as a tertiary-alkyl.

For example, the present method is shown in the following chemical equation:

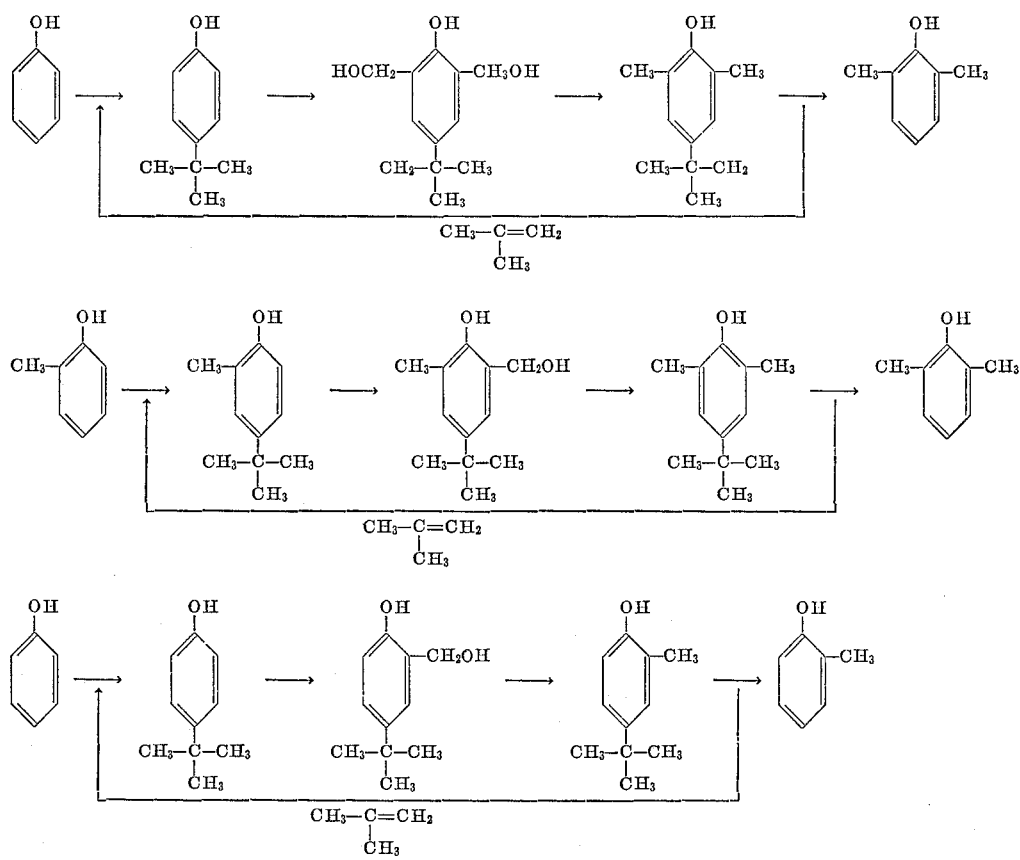

As shown by the above chemical equation, the present invention consists of four stages of the reactions, that is, tertiary-alkylation of a phenolic compound to form a tertiary-alkyl-substituted phenolic compound, hydroxymethylation of the resulting tertiary-alkyl-substituted phenolic compound to form a hydroxymethyl and tertiary-alkyl-substituted phenolic compound, reduction of the resulting hydroxymethyl- and tertiary-alkyl-substituted phenolic compound to form a methyl- and tertiary-alkyl-substituted phenolic compound and detertiary-alkylation of the resulting methyl- and tertiary-alkyl-substituted phenolic compound to form a methyl-substituted phenolic compound such as 2,6-xylenol or ortho-cresol.

In the present method, the tertiary-alkylation is carried out by reacting a phenolic compound with a tertiary-alkylating agent according to a known method or an analogous method thereof, and the hydroxymethylation is carried out by reacting a tertiary-alkyl-substituted phenolic compound with formaldehyde according to a known method or an analogous method thereof.

The reduction of hydroxymethyl- and tertiary-alkyl-substituted phenolic compound may be carried out by contacting the hydroxymethyl- and tertiary-alkyl-substituted phenolic compound with hydrogen in the presence of a catalyst.

As the catalyst, Raney-nickel, nickel-diatomaceous earth and copper-chromite may be employed.

The de-tertiary-alkylation of methyl- and tertiary-alkyl-substituted phenolic compound may be carried out easily by heating in the presence of an acidic catalyst to yield methyl-substituted phenolic compound such as 2,6-xylenol or ortho-cresol. The tertiary-alkyl is removed and olefin corresponding to the tertiary-alkyl is generated from the reaction system. The olefin itself or the tertiary-alkyl halide derived therefrom may be used again for the next tertiary-alkylation of phenolic compound.

The yield of each stage is so high that 2,6-xylenol or ortho-cresol may be obtained in high yield by the present method.

It is a characteristic property of a tertiary-alkyl that phenol nucleus may be easily alkylated or de-alkylated by a tertiary-alkyl. Crude 2,6-xylenol or ortho-cresol, which is produced by the present method as above mentioned, is refined by distillation or recrystallization. A small amount of non-reacted phenol, ortho-cresol and 2-methyl- or 2,6-dimethyl-4-tertiary-alkyl-phenol are detected in the refined product. But para- or meta-cresol or 2,3-, 2,4- or 2,5-xylenol, which is removed from ortho-cresol or 2,6-xylenol difficulty, is detceted scarcely.

As described above, the raw materials used in the present process are phenolic compound such as, phenol or ortho-cresol, formaldehyde and hydrogen, and all of them are easy to obtain at low price, and the present process does not contain any especial or difficult reaction or treatment, and makes it possible that ortho-cresol or 2,6-xylenol of high purity may be produced, so it is clear that the present process is industrially advantageous.

The present process is illustrated more particularly according to the stages of the reaction by using tertiary-butyl as a tertiary-alkyl. It goes without saying that a tertiary-alkyl is not limited to tertiary-butyl. The first stage is tertiary-butylation of phenol or ortho-cresol.

Tertiary-butylation of phenol was disclosed in the Chemical Abstracts, vol. 44, page 9198 (1959) or the Journal of the American Chemical Society, vol. 79, pages 87 to 92 (1957), in which phenol was converted to 4-tertiary-butylphenol by contacting phenol with tertiary-butylchloride or isobutylene.

In the present invention tertiary-butylation of phenol or ortho-cresol is carried out by the method similar to those of the above literatures. Further the present inventors found that tertiary-butyl alcohol may be used, also, for tertiary-butylation instead of tertiary-butyl chloride or isobutylene.

Phenol or ortho-cresol is converted to 4-tertiary-butyl-substituted phenolic compound in a selection ratio of above 80%, however the formation of 2-tertiary-butyl-phenol, 2-methyl-6-tertiary-butylphenol, 2,4- or 2,6-di-tertiary-butylphenol or 2-methyl-4, 6-di-tertiary-butyl-phenol is not avoidable.

But, 2-tertiary-butyl substituted phenol compound may be converted easily to 4-tertiary-butyl substituted phenol compounds by contacting them with aluminum trichloride, and di-tertiary-butyl substituted phenol compounds are converted easily to 4-tertiary-butyl substituted phenol compounds by contacting them with non-substituted phenol compounds. As a result 4-tertiary-butylphenol or 2-methyl-4-tertiary - butylphenol as tertiary - butylated phenol compound is produced in such a high yield as above 95% and 4-tertiary-butyl substituted phenol compound of high purity is obtained by fractional distillation or recrystallization of the crude product.

The second stage is hydroxymethylation.

Hydroxymethylation of 4-tertiary-butylphenol was disclosed in Journal fur pratische Chemie N. F., vol. 153, page 332 (1939).

According to the process of the present invention 2,6-dihydroxymethyl-4-tertiary - butylphenol hydroxymethyl-6-methyl-4-tertiary-butylphenol and 2-hydroxymethyl-4-tertiary-butylphenol may be obtained by a process similar to that of the literature.

The third stage is catalytic reduction.

2-hydroxymethyl-4-tertiary-butylphenol, 2,6 - dihydroxymethyl-4-tertiary-butylphenol or 2-methyl - 4 - tertiary-butyl-6-hydroxymethyl-phenol is contacted with hydrogen in the presence of a catalyst to be reduced to 2-methyl-4-tertiary-butylphenol or 2,6-dimethyl - 4 - tertiary - butylphenol. This reduction is carried out in a liquid medium under a super atmospheric pressure with heating and hydroxymethyl is converted to methyl in an almost quantitative yield.

The liquid medium employed includes a lower alcohol such as methanol, ethanol or isopropanol, an ether such as diisopropyl ether, dioxane or tetrahydrofuran and hydrocarbon such as hexane, heptane or cyclohexane, among which methanol is used conveniently.

The pressure of the reaction system is in the range of 10 to 150 kg./cm.$^2$. The reaction temperature is in the range of 100° C. to 200° C., and the reaction time is in the range of from 0.2 to 10 hours.

The catalyst employed includes Raney-nickel, nickel-diatomaceous earth and copper chromite which are useful for a usual reduction, and among these catalysts, copper-chromite catalyst gives the best result.

The amount of the catalyst is 0.5 to 10% by weight based on the weight of the hydroxymethyl substituted phenol compound.

The final stage is de-tertiarybutylation.

2,6-dimethyl - 4 - tertiary-butylphenol or 2-methyl - 4-tertiary-butylphenol is subjected to de-tertiary-butylation to yield 2,6-xylenol or ortho-cresol. De-tertiary-butylation proceeds easily at a temperature of 150° to 250° C., especially at 200° C. for 2 to 10 hours in the presence of a catalyst which includes, for example, aromatic sulfonic acids, such as benzene sulfonic acid, p-toluenesulfonic acid, xylene sulfonic acid, naphthalene sulfonic acid, methylnaphthalene sulfonic acid, sulfuric acid, phosphoric acid, hydrofluoric acid, aluminum trichloride, ferric chloride, zinc chloride, titanium tetrachloride and boron trifluoride and among these catalysts p-toluenesulfonic acid and sulfuric acid are the most practical.

This de-tertiary-butylation is a reversible reaction, so a small amount of the non-reacted compound is remained in the reaction system, it is known that, in this case, if the de-tertiary-butylated product is removed from the reaction system, the de-tertiary-butylation proceeds again. As a result, the yield of the de-tertiary-butylation is above 95% base on the weight of the consumed 2,6-dimethyl-4-tertiary-butyl phenol or 2-methyl-4-tertiary-butyl phenol.

At this de-tertiary-butylation, tertiary-butyl is put off from the phenol nucleus and almost amount of isobutylene in an amount of above 90% of removed isobutylene from the reaction system may be recovered and used for the next tertiary-butylation of phenol or orthocresol and a small amount of isobutylene is polymerized to form isobutylene polymers. Therefore the price of the tertiary-butlyating agent employed in the present process is too low to affect the total price to carry out the present invention.

When the de-tertiary-butylation is over, the catalyst is removed and the raw product is purified to yield objective 2,6-xylenol or ortho-cresol.

The present invention is illustrated more particularly by the following examples.

This invention is not limited, of course, only to these examples. All parts are by weight.

EXAMPLE 1

Stage 1

Two point five parts of aluminum trichloride was added to 150 parts of phenol, and to this mixture 56 parts of isobutylene was blown at 70° to 80° C. After the blowing of isobutylene was over, the stirring was continued for 1 hour at the same temperature. Water was added into the reaction mixture to decompose the catalyst.

The organic layer was washed well with water, and subjected to fractional distillation for purification.

141 parts of 4-tertiary-butylphenol of purity of above 99.5% was obtained, B.P. 239.5° C. The yield was 95.5% based on the consumed phenol.

Stage 2

Four hundred parts of 10% sodium hydroxide aqueous solution was added into 150 parts of 4-tertiary-butylphenol and then 164 parts of 37% formalin was added to the above mixture. The mixture was kept at the standing at 20° to 30° C. for 60 hours.

The mixture was acidified by addition of hydrochloric acid. White precipitates of 2,6-dihydroxymethyl-4-tertiary-butylphenol were collected by filtration. 164 parts of 2,6-dihydroxymethyl - 4-tertiary-butylphenol was obtained, M.P. 73° to 75° C. The yield was 78% based on consumed 4-tertiary-butylphenol.

Stage 3

The mixture of 105 parts of 2,6-dihydroxymethyl-4-tertiary-butylphenol, 400 parts of methanol and 5.3 parts of copper-chromite catalyst were put in a stainless steel autoclave, and the autoclave was closed tightly. After the internal gas of the autoclave was substituted by hydrogen, the mixture was kept under a pressure of 120 kg./cm.$^2$ at a temperature of 180° to 200° C. for 15 minutes to complete the reaction. After the reaction was over the catalyst was removed by filtration and then filtrate was concentrated to remove methanol and to yield the residue of 2,6-dimethyl-4-tertiary-butylphenol, M.P. 82° to 83° C., B.P. 240° C.

Stage 4 (a)

Zero point three parts of concentrated sulfuric acid was added to the residue obtained in the Stage 3, and the mixture was heated. When the temperature of the mixture raised up to about 160° C., it was recognized that isobutylene was generated.

The reaction was completed by heating the reaction mixture at 200° C. for 1 hour. After the reaction mixture was neutralized by soda ash, it was subjected to distillation. 52 parts of 2,6-xylenol of the purity of 99% was obtained. A small amount of ortho-cresol was found as an impurity in the thus obtained 2,6-xylenol. 2,6-dimethyl-4-tertiary-butylphenol remained as the distillation residue was mixed with concentrated sulfuric acid and again treated by the similar method as mentioned above to yield 2,6-xylenol.

The yield through the reduction of the Stage 3 and de-tertiary-butylation of the Stage 4 was 93% based on consumed 2,6-dihydroxymethyl-4-tertiary-butylphenol.

Stage 4 (b)

5 parts of p-toluene sulfonic acid was added to 100 parts of 2,6-dimethyl-4-tertiary-butylphenol obtained in the Stage 3.

The mixture was heated under stirring and boiled. When the temperature of the mixture was raised up to 240° to 245° C., it was recognized that isobutylene was generated. As the progress of the de-tertiary-butylation of 2,6-dimethyl-4-tertiary-butylphenol, it was recognized that the temperature of the mixture lowered slowly. After seven hours from the beginning of de-tertiary-butylation, the temperature of the mixture lowered to about 215° C. and the generation of isobutylene stopped and the reaction was over. The reaction product was analyzed, as the result it was found that the reaction product consisted of 2,6 - dimethyl-4-tertiary-butylphenol 12.6%, 2,6-xylenol 85.1%, 2 - methyl-4-tertiary-butylphenol 0.6%, o-cresol 1.3% and other components 0.4% (all per cents were based on the weights), and the selection ratio of this de-tertiary-butylation to 2,6-xylenol was 97.4%.

Each of 2,6-xylenol and 2,6-dimethyl-4-tertiary-butylphenol was separated respectively from the crude reaction product by fractional distillation, and 2,6-dimethyl-4-tertiary-butylphenol was subjected to de-tertiary-butylation by the similar treatment again, and the similar result was obtained.

In case benzene sulfonic acid or naphthalene monosulfonic acid was used in the above treatment instead of p-toluene sulfonic acid, the similar result was obtained.

EXAMPLE 2

Stage 1

One point six parts of aluminum trichloride was added to 108 parts of ortho-cresol and then 92.5 parts of tertiary-butyl chloride was added dropwise to the mixture under stirring at a temperature of 35° to 40° C. within 1 hour.

During the addition of tertiary-butyl chloride, a vigorous generation of hydrogen chloride was found. Hydrogen chloride was recovered as hydrochloric acid by introducing into water. After the addition of tertiarybutyl chloride was finished, the stirring was continued at a temperature of 35° to 40° C. for 30 minutes. Water was added to the reaction mixture to decompose the catalyst.

The oily layer was washed well with water and subjected to distillation to remove ortho-cresol and ditertiary-butylated ortho-cresol. 156 parts of 2-methyl-4-tertiary-butylphenol of purity of 99.3%, B.P. 247° C., was obtained with the yield of 97% based on consumed ortho-cresol.

Stage 2

One hundred and sixty four parts of 2-methyl-4-tertiary-butylphenol was added to 400 parts of 10% sodium hydroxide aqueous solution and then to the mixture of 82 parts of 37% formalin was added. The mixture was kept at the standing at a temperature of 20° to 30° C. for 2 days. The reaction mixture was neutralized by hydrochloric acid and the resulting organic layer was extracted with benzene.

The benzene layer was concentrated to give 166 parts of 2-methyl-4-tertiary-butyl-6-hydroxymethylphenol. The yield was 85.5% based on consumed 2-methyl-4-tertiary-butylphenol.

Stage 3

2-methyl-4-tertiary-butyl-6 - hydroxymethylphenol obtained in the Stage 2 was put in a stainless steel autoclave with 100 parts of methanol and 2.9 parts of copper-chromite catalyst.

The internal gas the autoclave was substituted by hydrogen and the mixture was kept under a pressure of 50 kg./cm.$^2$ at a temperature of 140° to 150° C. for 1.5 hours to complete the reaction. After the reaction was over, the catalyst was removed by filteration and then the filtrate was concentrated to remove methanol.

Stage 4

Zero point five part of concentrated sulfuric acid was added to the residue obtained in the Stage 3. When the mixture was heated up to a temperature of 200° to 205° C. it was recognized that isobutylene was vigorously generated. The generated isobutylene was introduced to hydrochloric acid previously recovered in the Stage 1, and converted to tertiary-butyl chloride, and resulting tertiary-butyl chloride was recycled to the next tertiary-butylation.

The de-tertiary-butylation was over by heating the mixture for 1 hour. The reaction mixture was neutralized by adding soda ash thereto, and subjected to fractional distillation. Thus 98.6 parts of 2,6-xylenol was obtained. The yield of 2,6-xylenol was 94.5% based on consumed 2-methyl-4-tertiary-butyl-6-hydroxymethyl-phenol through the reduction of the Stage 3 and detertiary-butylation of the Stage 4.

EXAMPLE 3

Stage 1

In the treatment similar to that of the Stage 1 of the Example 1, 4-tertiary-butylphenol was obtained.

Stage 2

The mixture of 150 parts of 4-tertiary-butylphenol, 400 parts of 10% sodium hydroxide and 81 parts of 37% formalin was kept at the standing at a temperature of 20° to 30° C. for 2 days.

The mixture was acidified by hydrochloric acid and as a result 2-hydroxymethyl-4-tertiary-butylphenol was obtained.

Stage 3

Fifty parts of methanol and 5 parts of copper chromite catalyst was added to 2-hydroxymethyl-4-tertiary-butylphenol obtained in the Stage 2 of the Example 3. The mixture was put in a stainless steel autoclave and heated at a temperature of 150° C. under a pressure of 100 kg./cm.$^2$ of hydrogen gas for 1 hour to complete the reduction. After the reaction was over, the catalyst was removed by filtration and then the filtrate was concentrated to remove methanol.

Stage 4

Zero point three parts of concentrated sulfuric acid was added to the residue obtained in the Stage 3 of the Example 3, and the mixture was heated up to a temperature of 190° to 200° C. to be subjected to de-tertiary-butylation. After the reaction was over the reaction mixture was neutralized by soda ash and subjected to fractional distillation. Thus 99 parts of ortho-cresol was obtained.

The yield of ortho-cresol through hydroxy-methylation of the Stage 2, reduction of the Stage 3 and de-tertiary-butylation of the Stage 4 was 91.5% based on the weight of consumed 4-tertiary-butylphenol. A small amount of 2,6-xylenol was produced in these treatments as a by-product.

We claim:

1. A method for preparing 2,6-xylenol of high purity, which comprises reacting a phenolic compound selected from the group consisting of phenol and o-cresol with a tertiary compound selected from the group consisting of a tertiary olefin having 4 to 6 carbon atoms and a tertiary alkyl halide having 4 to 6 carbon atoms in the presence of a catalyst selected from the group consisting of aluminum chloride and an aluminum chloride containing catalyst to selectively introduce a tertiary alkyl group at a position para to the hydroxyl group, reacting formaldehyde in an alkaline aqueous solution with the tertiary alkyl substituted compound to introduce a hydroxymethyl group at each position ortho to a hydroxyl group, subjecting the hydroxymethylated compound to a reduction reaction in the presence of hydrogen in an aliphatic saturated lower alcohol at 100° to 200° C. under a pressure of 10-150 kg./cm.$^2$ and in the presence of a copper chromite catalyst, heating the resulting compound at 150° to 250° C. in the presence of a catalyst selected from the group consisting of sulfuric acid and an aromatic sulfonic acid, and rectifying the reaction products from the previous step to obtain substantially pure 2,6-xylenol.

2. A method according to claim 1, wherein a tertiary olefin is generated in the course of the step of heating at 150–250° C., and further comprising recycling said tertiary olefin for use as said tertiary compound for reaction with said phenolic compound.

3. A method according to claim 1, wherein said tertiary compound is a tertiary butyl compound.

4. A method according to claim 3, wherein the aliphatic saturated lower alcohol is a member selected from the group consisting of methanol, ethanol, and isopropanol.

5. A method according to claim 1, wherein said tertiary compound is isobutylene.

6. A method according to claim 1, wherein said tertiary compound is a tertiary butyl halide and wherein the corresponding hydrogen halide is generated in the reaction with said phenolic compound, and further comprising recovering said hydrogen halide by dissolution in water, and reacting said hydrogen halide in water with isobutylene recovered from the step of heating at 150° to 250° C. to produce the corresponding tertiary butyl halide, and recycling said corresponding tertiary butyl halide for use as said tertiary compound for reaction with said phenolic compound.

7. A method according to claim 1, wherein the aliphatic saturated lower alcohol is a member selected from the group consisting of methanol, ethanol and isopropanol.

References Cited

UNITED STATES PATENTS

| | | | |
|---|---|---|---|
| 2,603,662 | 7/1952 | Stevens | 260—621 X |
| 2,909,568 | 10/1959 | Gleim | 260—621 X |

LEON ZITVER, Primary Examiner

N. P. MORGENSTERN, Assistant Examiner

U.S. Cl. X.R.

260—624